US012566850B2

(12) United States Patent
Bercovitz et al.

(10) Patent No.: US 12,566,850 B2
(45) Date of Patent: Mar. 3, 2026

(54) TEMPORAL CAUSE ANALYSIS OF CYBERSECURITY EVENTS

(71) Applicant: Dazz, Inc., San Francisco, CA (US)

(72) Inventors: Barak Bercovitz, Even-Yehuda (IL); Tomer Schwartz, Tel Aviv (IL); Bernie Pinkenzon-Howard, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/169,666

(22) Filed: Apr. 3, 2025

(65) Prior Publication Data

US 2026/0010622 A1     Jan. 8, 2026

Related U.S. Application Data

(63) Continuation of application No. 18/762,308, filed on Jul. 2, 2024.

(51) Int. Cl.
H04L 9/08 (2006.01)
G06F 21/55 (2013.01)
H04L 9/32 (2006.01)

(52) U.S. Cl.
CPC ...... G06F 21/554 (2013.01); G06F 2221/034 (2013.01)

(58) Field of Classification Search
CPC ........................ G06F 21/554; G06F 2221/034
USPC ........................................................ 726/23
See application file for complete search history.

(56) References Cited

U.S. PATENT DOCUMENTS

| | | | |
|---|---|---|---|
| 8,468,244 B2 | 6/2013 | Redlich et al. | |
| 8,639,506 B2 * | 1/2014 | Miro ....................... | G10L 15/12 |
| | | | 704/231 |
| 9,800,592 B2 | 10/2017 | Jain et al. | |
| 10,929,220 B2 | 2/2021 | Song et al. | |

(Continued)

FOREIGN PATENT DOCUMENTS

EP          4303775 A1      1/2024

OTHER PUBLICATIONS

"Dynamic Time Warping," Papers with Code (available at https://paperswithcode.com/method/dtw) (last accessed May 3, 2024 at 3:47 Pm Est).

(Continued)

*Primary Examiner* — Taghi T Arani
*Assistant Examiner* — Pegah Barzegar
(74) *Attorney, Agent, or Firm* — M&B IP Analysts, LLC

(57)          ABSTRACT

A system and method for temporal cause analysis of cybersecurity events. A method includes creating a time series pair including a first time series and a second time series each including a series of data points arranged by time. A distance is determined between the first and second time series based on the data points of the first and second time series. A match is identified between the first and second time series based on the distance. An antecedent-consequent relationship is determined for the time series pair based on the match. The first time series is determined as an antecedent time series and the second time series is determined as a consequent time series. A root cause of a cyber event is identified based on the antecedent-consequent relationship where the cyber event is represented in the second time series, and the root cause is represented in the first time series.

20 Claims, 6 Drawing Sheets

(56)        References Cited

U.S. PATENT DOCUMENTS

| | | | | |
|---|---|---|---|---|
| 10,956,566 | B2 | 3/2021 | Shu et al. | |
| 11,494,618 | B2 * | 11/2022 | Xia | G06N 3/045 |
| 11,743,287 | B2 | 8/2023 | Nagarajegowda et al. | |
| 12,153,669 | B2 | 11/2024 | Arnon et al. | |
| 2015/0312304 | A1 * | 10/2015 | Landais | H04L 65/80 |
| | | | | 709/219 |
| 2017/0364803 | A1 * | 12/2017 | Calmon | G06N 3/09 |
| 2018/0234447 | A1 * | 8/2018 | Mueen | G06F 16/2255 |
| 2019/0114244 | A1 | 4/2019 | Salunke et al. | |
| 2020/0159600 | A1 | 5/2020 | Thakore et al. | |
| 2020/0201701 | A1 | 6/2020 | Wang et al. | |
| 2020/0233019 | A1 * | 7/2020 | Atobe | G06F 13/00 |
| 2022/0078210 | A1 * | 3/2022 | Crabtree | G06F 16/9024 |
| 2023/0092190 | A1 * | 3/2023 | Homayoun | G06N 20/00 |
| | | | | 726/26 |
| 2023/0325269 | A1 * | 10/2023 | Gusat | G06F 11/0709 |
| | | | | 714/2 |
| 2023/0342454 | A1 * | 10/2023 | Pierre | G06F 21/554 |
| 2024/0118965 | A1 | 4/2024 | Ashrafi et al. | |
| 2024/0134978 | A1 * | 4/2024 | Licudi | G06F 9/542 |
| 2025/0181712 | A1 * | 6/2025 | Kosan | G06F 21/577 |

OTHER PUBLICATIONS

International Search Report for PCT/IB2025/056415, dated Sep. 1, 2025. Searching Authority, Israel Patent Office, Jerusalem, Israel. Written Opinion of the Searching Authority for PCT/IB2025/056415, dated Sep. 1, 2025. Searching Authority, Israel Patent Office, Jerusalem, Israel.

* cited by examiner

TEMPORAL CAUSE ANALYSIS OF CYBERSECURITY EVENTS

CROSS-REFERENCE TO RELATED APPLICATIONS

This application is a continuation of U.S. patent application Ser. No. 18/762,308 filed on Jul. 2, 2024, now pending, the contents of which are hereby incorporated by reference.

TECHNICAL FIELD

The present disclosure relates generally to identifying sources of cybersecurity threats, and more specifically to temporal cause analysis of cybersecurity events.

BACKGROUND

Modern computing environments may deploy many software and hardware components in order to realize applicable computing needs. With the size and scale of modern computing infrastructures, pinpointing sources of threats to cybersecurity ("cyber threats") is an increasingly difficult challenge. At the same time, prompt identification of cyber threats may be needed to effectively mitigate some cyber threats. Thus, solutions which allow for improving identification of sources of cyber threats are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for temporal cause analysis. The method comprises: creating a time series pair for a computing environment, wherein the time series pair includes a first time series and a second time series, wherein each of the first time series and the second time series includes a series of data points arranged by time; determining a distance between the first time series and the second time series based on the series of data points of each of the first time series and the second time series; identifying a match between the first time series and the second time series based on the determined distance; determining an antecedent-consequent relationship for the time series pair based on the identified match between the first time series and the second time series, wherein the first time series is determined as an antecedent time series of the antecedent-consequent relationship and that the second time series is a consequent time series of the antecedent-consequent relationship; and identifying a root cause of a cyber event based on the temporal relationship, wherein the cyber event is defined with respect to at least one of the data points of the series of data points of the second time series, wherein the root cause of the cyber event is identified based further on at least one of the data points of the series of data points of the first time series.

Certain embodiments disclosed herein also include a non-transitory computer readable medium having stored thereon causing a processing circuitry to execute a process, the process comprising: creating a time series pair for a computing environment, wherein the time series pair includes a first time series and a second time series, wherein each of the first time series and the second time series includes a series of data points arranged by time; determining a distance between the first time series and the second time series based on the series of data points of each of the first time series and the second time series; identifying a match between the first time series and the second time series based on the determined distance; determining an antecedent-consequent relationship for the time series pair based on the identified match between the first time series and the second time series, wherein the first time series is determined as an antecedent time series of the antecedent-consequent relationship and that the second time series is a consequent time series of the antecedent-consequent relationship; and identifying a root cause of a cyber event based on the temporal relationship, wherein the cyber event is defined with respect to at least one of the data points of the series of data points of the second time series, wherein the root cause of the cyber event is identified based further on at least one of the data points of the series of data points of the first time series.

Certain embodiments disclosed herein also include a system for temporal cause analysis of cybersecurity events. The system comprises: a processing circuitry; and a memory, the memory containing instructions that, when executed by the processing circuitry, configure the system to: create a time series pair for a computing environment, wherein the time series pair includes a first time series and a second time series, wherein each of the first time series and the second time series includes a series of data points arranged by time; determine a distance between the first time series and the second time series based on the series of data points of each of the first time series and the second time series; identify a match between the first time series and the second time series based on the determined distance; determine an antecedent-consequent relationship for the time series pair based on the identified match between the first time series and the second time series, wherein the first time series is determined as an antecedent time series of the antecedent-consequent relationship and that the second time series is a consequent time series of the antecedent-consequent relationship; and identify a root cause of a cyber event based on the temporal relationship, wherein the cyber event is defined with respect to at least one of the data points of the series of data points of the second time series, wherein the root cause of the cyber event is identified based further on at least one of the data points of the series of data points of the first time series.

Certain embodiments disclosed herein include the method, non-transitory computer readable medium, or system noted above, further including or being configured to perform the following step or steps: identifying a plurality of events with respect to the series of data points of each of the first time series and the second time series, each event having a corresponding time, wherein the distance is determined based on the plurality of events identified with respect to the series of data points of each of the first time series and the second time series.

US 12,566,850 B2

3

Certain embodiments disclosed herein include the method, non-transitory computer readable medium, or system noted above, further including or being configured to perform the following step or steps: determining a plurality of first distances between times of events of the first time series and times of events of the second time series, wherein the second distance is determined based on the plurality of first distances.

Certain embodiments disclosed herein include the method, non-transitory computer readable medium, or system noted above, wherein the plurality of events identified with respect to the series of data points of the first time series is a plurality of antecedent events, wherein the plurality of events identified with respect to the series of data points of the second time series is a plurality of consequent events, further including or being configured to perform the following step or steps: correlating each antecedent event of the plurality of antecedent events to at least one consequent event of the plurality of consequent events, wherein each antecedent event occurs earlier in time than the correlated at least one consequent event for the antecedent event.

Certain embodiments disclosed herein include the method, non-transitory computer readable medium, or system noted above, further including or being configured to perform the following step or steps: determining an antecedent event for the cyber event, wherein the antecedent event is determined with respect to at least one of the data points of the series of data points of the first time series, wherein the root cause of the cyber event is identified based on the determined antecedent event for the cyber event.

Certain embodiments disclosed herein include the method, non-transitory computer readable medium, or system noted above, further including or being configured to perform the following step or steps: analyzing a plurality of time deltas between the series of data points of the first time series and the cyber event, wherein the antecedent event for the cyber event is identified based on the analyzed plurality of time deltas.

Certain embodiments disclosed herein include the method, non-transitory computer readable medium, or system noted above, wherein the distance is determined using dynamic time warping.

Certain embodiments disclosed herein include the method, non-transitory computer readable medium, or system noted above, wherein the antecedent time series of the antecedent-consequent relationship precedes the consequent time series of the antecedent-consequent relationship.

Certain embodiments disclosed herein include the method, non-transitory computer readable medium, or system noted above, further including or being configured to perform the following step or steps: performing at least one remediation action based on the identified root cause of the cyber event.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

4

Figure 3:
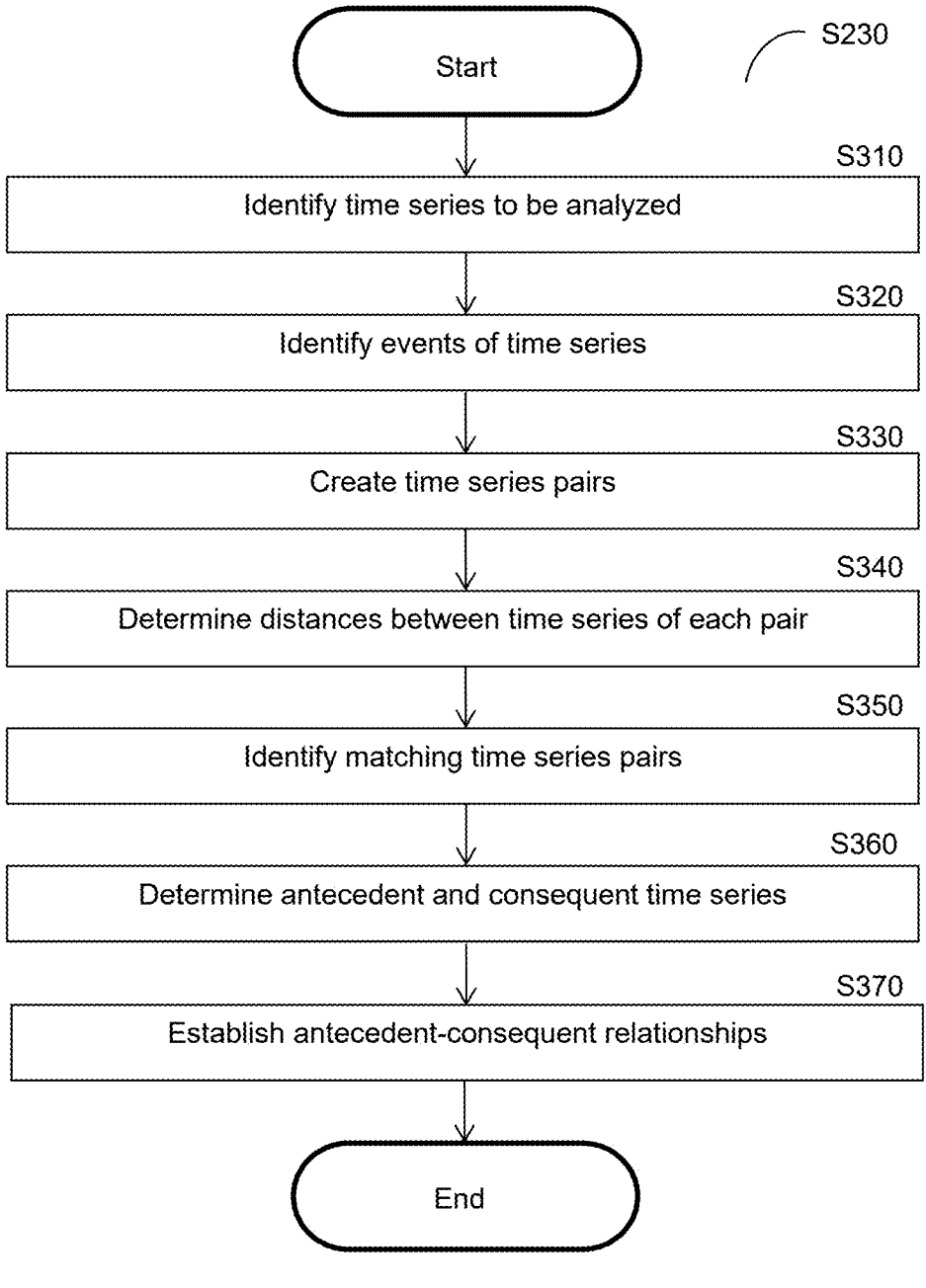

FIG. 3 is a flowchart illustrating a method for determining a temporal relationship between time series according to an embodiment.

Figure 4:
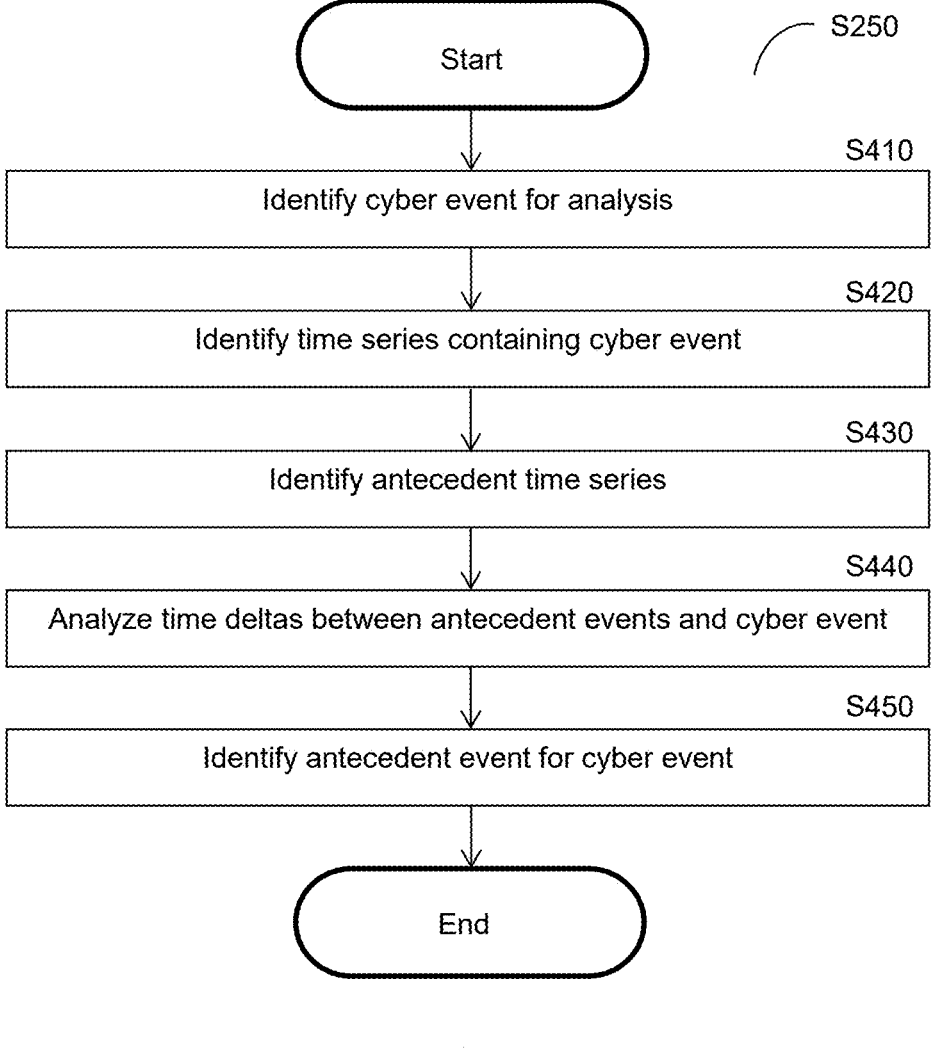

FIG. 4 is a flowchart illustrating a method for correlating events using temporal cause analysis according to an embodiment.

Figure 5A:
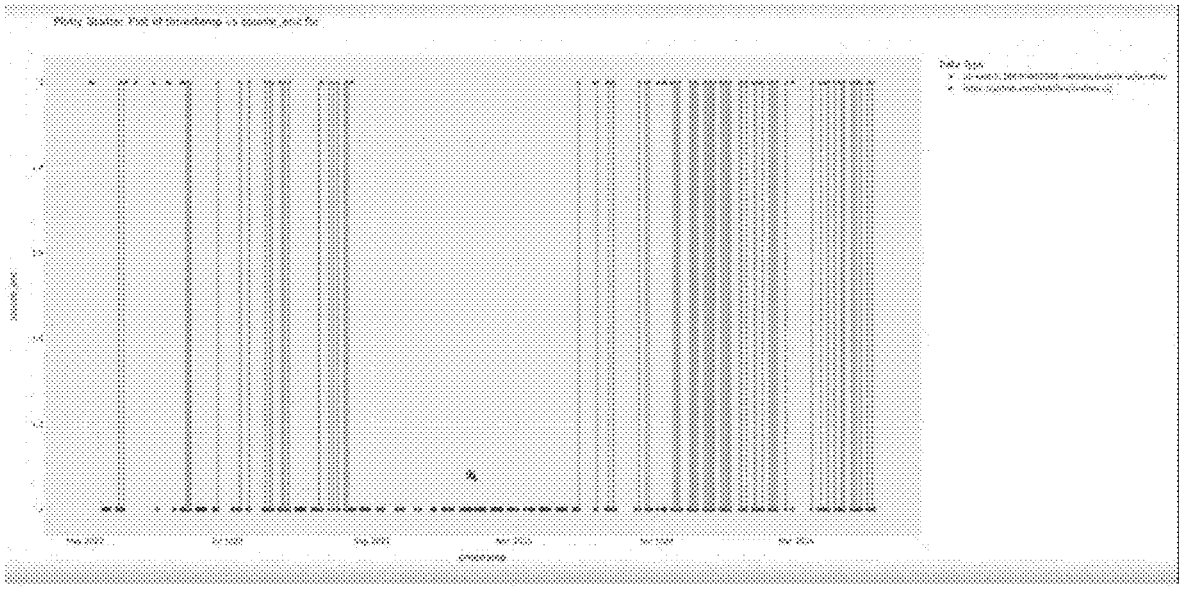
Figure 5B:
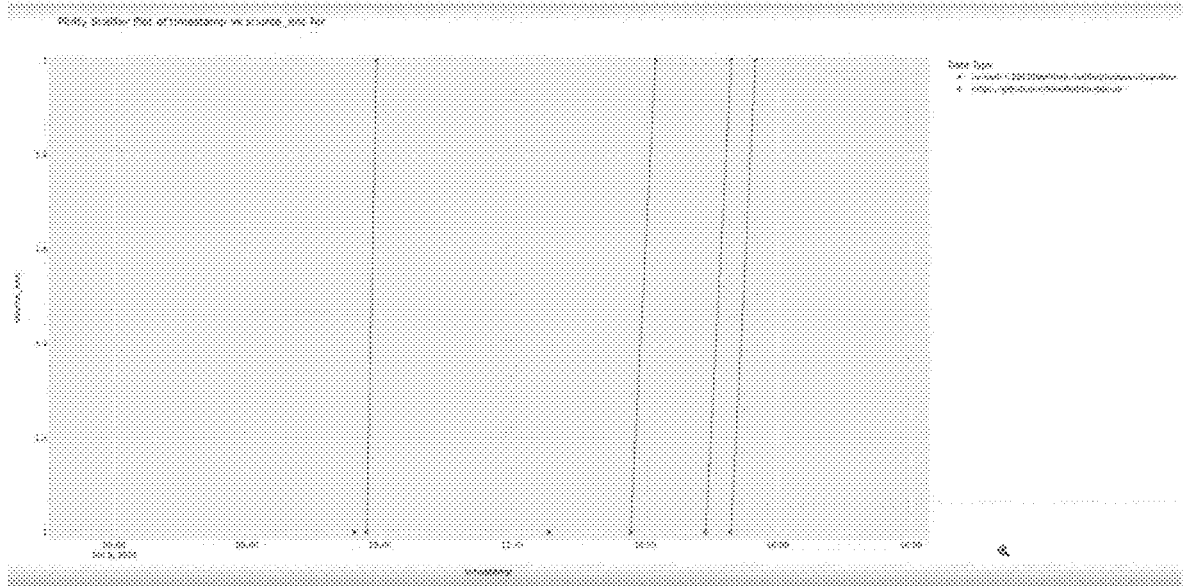

FIGS. 5A-B are example illustrations utilized to describe temporal cause analysis in accordance with various disclosed embodiments.

Figure 6:
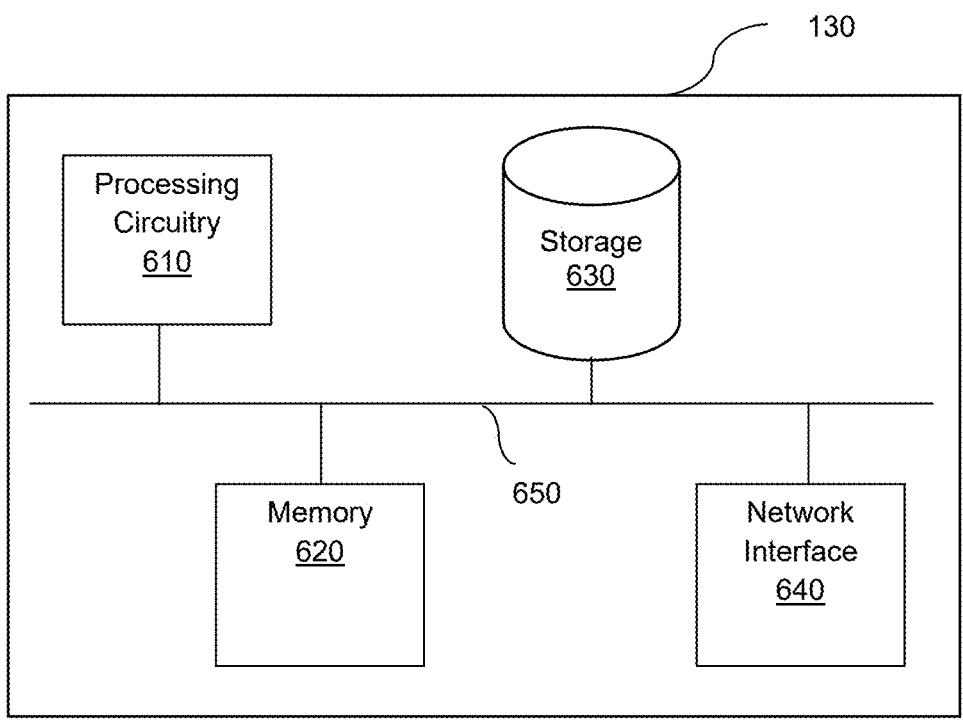

FIG. 6 is a schematic diagram of a temporal cause analyzer according to an embodiment.

DETAILED DESCRIPTION

It has been identified that, by leveraging an assumption that cybersecurity events represented in some time series are a consequence of events such as changes (e.g., changes caused by commits) which are represented in other time series, potential sources of cybersecurity events may be identified more flexibly than existing solutions and allow for more accurately identifying the source of a cyber threat. That is, when a connection between two time series is identified, a cybersecurity event in one of the time series can be correlated to an event in the other time series in order to aid in determining a source of the cybersecurity event.

Accordingly, various disclosed embodiments include techniques for analyzing temporal causes of cybersecurity events which utilize temporal relationships between time series. Further, the disclosed embodiments include techniques for identifying connections between time series as well as techniques for correlating events between time series which may be utilized to identify causes of cybersecurity events linked based on time. Moreover, temporal causes of a cybersecurity event in the form of other events which were correlated to the cybersecurity event may be utilized in order to remediate cyber threats, for example by using the temporal causes to determine which remediation steps to apply, where to apply remediation steps (e.g., to certain software components, computing environments, networks, etc.), or both.

In an embodiment, events within a computing environment are converted into respective time series. Each time series is a series of data points arranged in time order, where the data points include values over time. The data points may include points representing discrete events (e.g., executing a commit or pushing a container image), points of parameters (e.g., power consumption), or both. That is, a given time series may be or may include points corresponding to times at which discrete events occur, or points including values which fluctuate over time. In this regard, each event represented in a given time series may be defined with respect to a discrete activity (e.g., a deployment, change, access, or other activity with respect to an entity), or may be defined with respect to the values of parameters represented in the time series (e.g., based on a change in the values, an abnormal value, or other criteria defined with respect to the values). That is, each time series may explicitly indicate events defined based on discrete activities which may be detected for a computing environment, or may be analyzed to identify events based on changes in parameters for entities of the computing environment.

When events are defined with respect to values of parameters, the events may be determined with respect to the time series, for example, by identifying values which are either above or below a threshold in a given time series as an event, by identifying changes in values above a threshold which occur within a certain threshold of time, both, and the like.

Such a threshold may be predetermined (e.g., using a predetermined threshold associated with a type of parameter represented in the time series), may be determined using statistical analysis of the respective time series, may be determined by applying a machine learning model to historical data (e.g., historical data for that type of parameter), a combination thereof, and the like.

In an embodiment, pairs of time series (also referred to as time series pairs) are created, with each time series pair including a first time series and a second time series. Each of the time series pairs is analyzed for a potential antecedent-consequent relationship (also referred to as an antecedent relationship). For one or more of the time series pairs, an antecedent relationship is determined between the first time series and the second time series of the pair. More specifically, one of the time series in a given pair is identified as antecedent to the other time series, where the other time series is identified as consequent for the pair. In other words, events of the identified antecedent time series in a given pair are potential temporal causes of events in the identified consequent time series or otherwise precede corresponding events in the consequent time series for the pair. The result is identification of one or more antecedent-consequent time series pairs (also referred to as antecedent relationship time series pairs or antecedent-consequent time series pairs).

In a further embodiment, the antecedent relationships for time series pairs are determined by analyzing distances between the time series in each pair. To this end, in yet a further embodiment, a dynamic time warping (DTW) process is utilized in order to determine a distance between the first and second time series of each time series pair and to determine, based on such a distance, whether the first and second time series of each pair match. For example, time series pairs having a distance below a threshold may be identified as matching. Such a distance may be determined as a Euclidean distance calculated based on vector representations of the data in each time series (e.g., a Euclidean distance between the vectors). Matching pairs of time series may be identified as having an antecedent relationship.

In this regard, it has been identified that dynamic time warping can be leveraged to enable new methods for identifying causes of cybersecurity events. That is, by converting cyber activity data into time series, causal relationships between different parameters may be established using dynamic time warping. More specifically, dynamic time warping may be utilized to identify different time series (and, consequently, their respective underlying parameters) which demonstrate a temporally linked relationship. These temporally linked relationships may, in turn, be leveraged in order to identify potential root causes of cybersecurity events by correlating events in consequent time series with events in corresponding antecedent time series as discussed herein.

The disclosed embodiments therefore allow for unearthing new potential root causes of cybersecurity events, which in turn allows for increasing security of computing environments acted upon based on the root causes as discussed herein. Moreover, the disclosed embodiments allow for unearthing these new potential root causes in a manner that can be automated and does not require manual intervention, i.e., by having a hypothetical manual operator compare charts and determine whether patterns in the charts "look" or "feel" related using subjective judgment. Rather, the disclosed embodiments provide techniques which utilize specific, objective criteria such as matching within a threshold distance using DTW, that enable automatically identifying causal relationships between parameters consistently and objectively.

Figure 1:
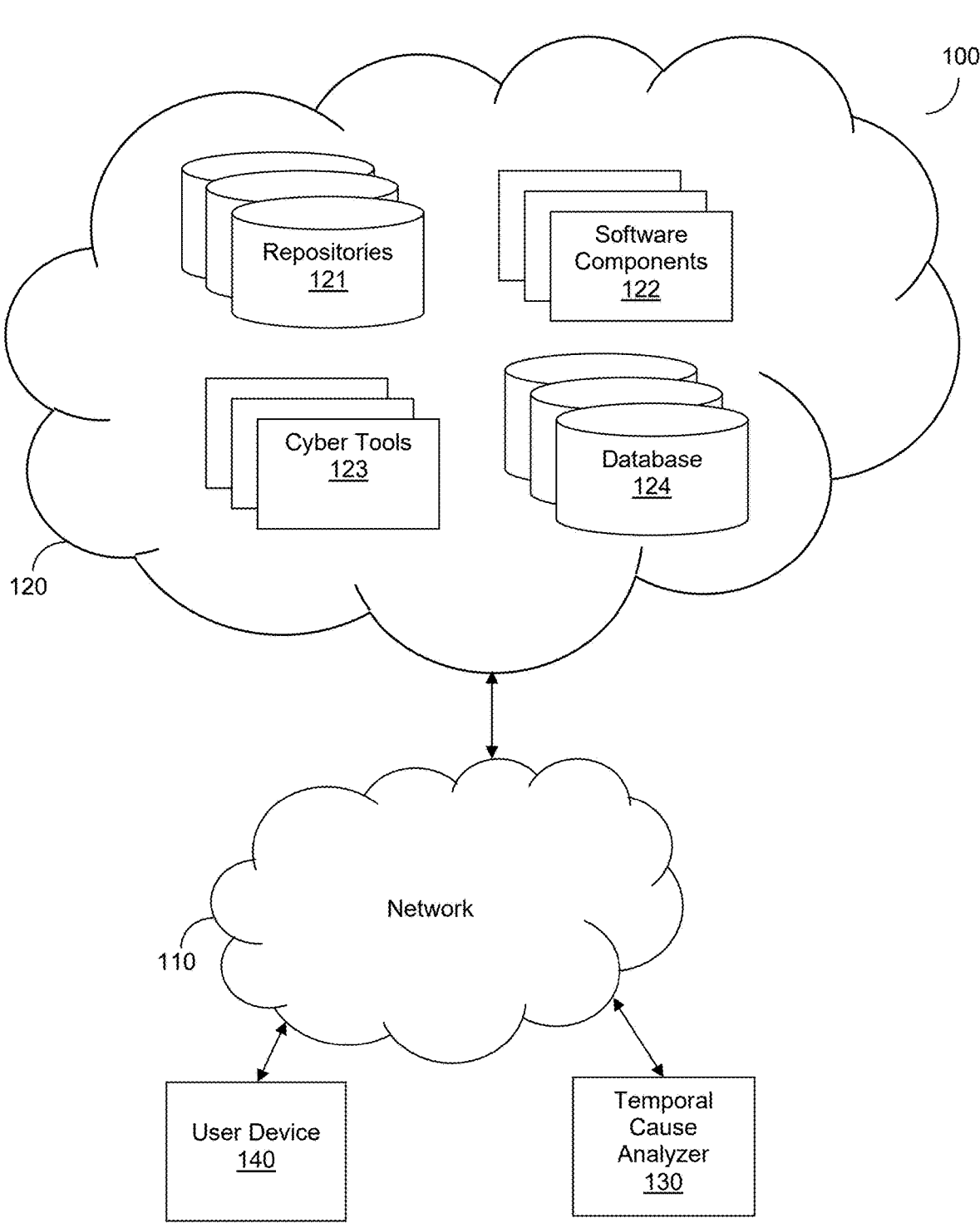
FIG. 1 is a network diagram utilized to describe various disclosed embodiments.

FIG. 1 shows an example network diagram 100 utilized to describe the various disclosed embodiments. In the example network diagram 100, a computing environment 120, a temporal cause analyzer 130, and a user device 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 may be a computing environment to be protected against cyber threats in accordance with various disclosed embodiments. To this end, the computing environment 120 may include any or all of one or more repositories 121, one or more software components 122, one or more cybersecurity tools (cyber tools) 123, and one or more databases 124.

The repositories 121 may be sources of code or other files used by or to realize software components such as, but not limited to, the software components 122. As a non-limiting example, the repositories 121 may be or may include container repositories including software packages of container images used to run containerized applications. In some implementations, the repositories 121 may report log data or other data for which certain aspects may be represented by respective parameters via time series and analyzed as discussed herein. For example, the repositories 121 may report data related to event logs, where the event logs indicate access events in which data stored in the repositories is accessed (e.g., to retrieve a container image in order to deploy a logical component such as a software container).

The software components 122 are computing components utilized to perform various activities within the computing environment 120. As a non-limiting example, the software components 122 may be or may include software containers or systems that run software containers, virtual machines or other virtualized systems, software applications, other logical components, and the like. The software components 122 may be targets of, or causes of, cybersecurity events analyzed as discussed herein. For example, a vulnerability in one of the software components 122 may be exploited, thereby resulting in an event in a set of parameters related to operation of the software component 122 which causes a cyber event in another set of parameters. In some implementations, the software components 122 may report data to be represented via time series and analyzed as discussed herein, for example, data including values of parameters related to certain aspects of operation of the software components 122. Alternatively, such data may be provided by one or more other systems (not shown) deployed in or with respect to the computing environment 120.

The cybersecurity tools (cyber tools) 123 may include, but are not limited to, scanners or other cybersecurity tools configured to detect cybersecurity events within the computing environment 120. It should be noted that the cybersecurity tools 123 are depicted as being deployed within the computing environment 120, but that any or all of the cybersecurity tools 123 may be deployed outside of the computing environment 120 without departing from the scope of the disclosure. The cybersecurity tools 123 may provide cybersecurity event data which may be represented in time series and analyzed in order to identify sources of cybersecurity events in accordance with various disclosed embodiments. Moreover, in some implementations, the cybersecurity tools 123 may provide data including certain parameters to be represented via time series and analyzed as discussed herein.

The databases 124 may store any or all of the data to be represented by time series as discussed above. To this end, data stored in the databases 124 may be collected from any or all of the repositories 121, the software components 122, the cybersecurity tools 123, other systems, and the like.

The temporal cause analyzer 130 is configured to identify temporally linked causes of cybersecurity events via time series analysis as described herein. The temporal cause analyzer 130 may be further configured to determine sources of cyber threats based on the temporally linked causes. To aid in identifying temporally linked causes, the temporal cause analyzer 130 may be further configured to identify temporal relationships between time series (e.g., between sets of parameters represented by respective sets of time series) in which a time series representing a first antecedent parameter is determined to be antecedent to a time series representing a second consequent parameter such that events represented in the antecedent parameter time series may be determined as sources for cyber events represented in the corresponding consequent parameter time series.

The user device 140 may be, but is not limited to, a personal computer, a laptop, a tablet computer, a smartphone, a wearable computing device, or any other device capable of receiving and displaying notifications. The user device 140 may receive notifications generated by the temporal cause analyzer 130 indicating sources of cybersecurity events. In some example implementations, the user device 140 may be utilized by an information technology (IT) professional who may take actions to further secure the computing environment 120 based on the identified sources of cyber threats.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
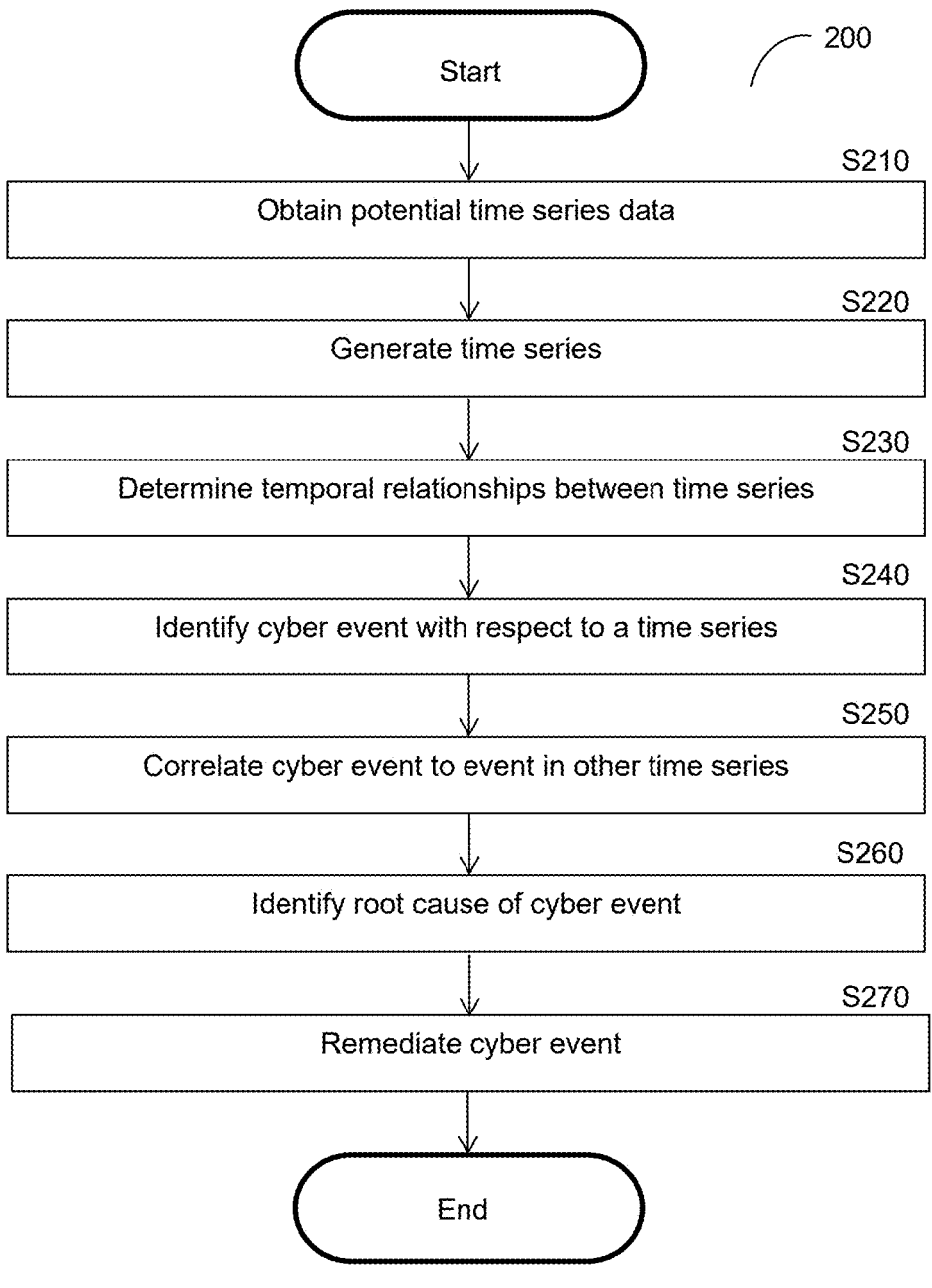
FIG. 2 is a flowchart illustrating a method for remediating cyber threats using temporal cause analysis according to an embodiment.

FIG. 2 is a flowchart 200 illustrating a method for remediating cyber threats using temporal cause analysis according to an embodiment. In an embodiment, the method is performed by the temporal cause analyzer 130, FIG. 1.

At S210, potential time series data is obtained. The potential time series data includes data of a computing environment (e.g., a cloud computing environment) such as, but not limited to, data indicating discrete events occurring within or with respect to the computing environment, data indicating values of parameters related to the computing environment (e.g., values of measurements captured within or otherwise with respect to the computing environment), both, and the like. As noted above, values of parameters may be analyzed in order to identify events for time series which plot those values over time.

The potential time series data may be collected over time by one or more computing components deployed in or otherwise with respect to the computing environment. More specifically, the data is tracked over time and, consequently, includes timestamps or other indicators of time at which the data was collected or when certain events occurred. This time data may be used in order to determine temporal relationships between the time series as discussed herein and, in particular, may be used to identify events which precede other events in pairs of time series having an antecedent-consequent relationship as described further below.

In an embodiment, different sets of time series data corresponding to different entities may be identified. As a non-limiting example, a first time series may be identified as a time series including events related to a code repository (e.g., events including commit operations being performed with respect to the code repository), and a second time series may be identified as a time series including events related to a container repository (e.g., events including pushing of container images of software containers to the container repository). In another embodiment, different sets of time series corresponding to different types of events may be identified. In a further embodiment, different sets of time series may correspond to different combinations of entity and event type.

That is, events may be defined with respect to entities such that each discrete event related to a given entity is plotted in a time series for the entity, events may be defined with respect to type such that events of the same type are plotted in a time series for that event type, or events may be defined with respect to entity and type such that events related to the same entity which are also of the same type are plotted in a time series for that combination of entity and event type. Different definitions of events may be utilized for different use cases, for example, in order to adjust granularity depending on sensitivity of the computing environment or data stored therein, or otherwise to flexibly adapt cybersecurity within the computing environment.

At S220, multiple time series are generated using the potential time series data. Each time series is a series of data points arranged by time (i.e., in time order) and may be or may include, but are not limited to, a set of data points corresponding to discrete events for a computing environment at different points in time, a set of data points corresponding to respective values of parameters (e.g., measurements) related to the computing environment, and the like.

In an embodiment, each time series represents corresponding events, and the corresponding events of each time series are associated with respective times represented in the time series. That is, events for each time series are associated with respective points in time of the time series. The times associated with respective events may be utilized to correlate between time series in order to identify antecedent-consequent relationships between time series as discussed herein.

In a further embodiment, generating at least some of the time series includes analyzing data points of the time series in order to identify events. As noted above, events may be explicitly represented (e.g., as data points representing times at which certain events occurred), or may be determined by analyzing non-event data points (e.g., data points which represent measurements or other values of parameters which might be indicative of notable events in the computing environment). To this end, for time series which include data points representing times of explicit events, the times of those data points may be identified as the events for subsequent analysis.

For time series which include data points representing non-event values for which events can be determined implicitly, in yet a further embodiment, generating those time series includes analyzing the data points using one or more implicit event identification rules. Such implicit event identification rules may be defined with respect to certain values, combinations of values, changes in values, and the like. For example, the implicit event identification rules may define an event as occurring at a time or times when a value exceeds or is below a threshold (e.g., a predetermined threshold value or predetermined proportion of an average or other representative value), when values have exceeded or went below a threshold for at least a threshold period of time, when values change suddenly (e.g., when the change in values between any two points in time is above a threshold, or when the change in values is above a threshold within a threshold period of time), and the like. For each event identified implicitly based on values, a corresponding time for the event may be determined, for example, either as the time of a particular value or change in value, a time at the middle of a period of time of an event which was detected based on multiple times, and the like.

At S230, temporal relationships between time series are determined. In an embodiment, the temporal relationships may be identified based on times of events in respective time series. That is, each event may have a corresponding time, and the corresponding times of events may be analyzed between time series in order to determine temporal relationships. As discussed herein, by organizing events temporally and analyzing for potential temporal relationships as discussed herein, relationships between antecedent and consequent events occurring within the computing environment may be established. In other words, a first time series acting as an antecedent time series can be utilized to effectively predict certain events of a second time series and, inversely, events of the second time series may be traced back to the first time series as a potential root cause.

In an embodiment, each identified temporal relationship includes a first time series among a set of time series acting as an antecedent time series, and a second time series among that set of time series acting as a consequent time series. In other words, the temporal relationships at least include antecedent-consequent relationships (also referred to as simply "antecedent relationships"), where one time series (the antecedent time series) precedes the other time series (the consequent time series) such that at least some of the events represented in the antecedent time series occur prior to at least some events represented in the consequent time series, and each antecedent event among the antecedent time series is correlated to one or more respective consequent events among the consequent time series such that a given antecedent event occurs earlier in time than the correlated consequent event. In this regard, the antecedent event correlated to a given consequent event effectively represents an activity related to a potential root cause of the consequent event.

In an embodiment, one or more sets of temporally related time series are identified, where the different time series among each set are temporally related to each other such that certain events reflected in a first time series among each set are followed by certain other events as reflected in a second time series for that set of temporally related time series. An example process for identifying temporal relationships between time series is discussed further below with respect to FIG. 3.

At S240, a cyber event is identified with respect to one of the time series. More specifically, in an embodiment, the cyber event is a cybersecurity event which is represented in a consequent time series of one of the time series pairs. The cyber event may be, but is not limited to, a cybersecurity event generated or otherwise reported by one or more cybersecurity tools (e.g., the cyber tools 123, FIG. 1). Such reporting may further indicate the time at which the cyber event occurred or otherwise when the cyber event was detected.

In an embodiment, identifying the cyber event with respect to one of the time series includes identifying a corresponding consequent event in a consequent time series which is temporally proximate to the cyber event. In a further embodiment, such a temporally proximate consequent event for the cyber event is an event which occurred at the same time or within a predetermined threshold period of time from when the cyber event occurred or was detected. In yet a further embodiment, the cyber event may be detected with respect to one or more entities or activities within the computing environment, and the time of the cyber event is only compared to time series corresponding to one of the entities or activities. That is, time series related to a given entity indicated in the reporting data for the cyber event may be analyzed for events which are temporally proximate to the cyber event.

At S250, the cyber event is correlated as a consequent event to an antecedent event represented in another time series. More specifically, an antecedent time series is identified for a consequent time series to which the cyber event belongs, and that consequent time series of the cyber event is analyzed in order to determine a correlation between the cyber event as represented in the consequent time series and an antecedent event represented in the corresponding antecedent time series for the consequent time series (e.g., the antecedent time series in the time series pair containing the consequent time series of the cyber event) which make up one or more antecedent events for the cyber event. In an embodiment, each antecedent event for a consequent event precedes the consequent event and is correlated to the cyber event such that each antecedent event effectively represents a potential source or otherwise a root cause of the cyber event.

More specifically, the cyber event is correlated to an antecedent event based on the temporal relationship between the antecedent time series having the antecedent event and the corresponding consequent time series having the cyber event. As discussed herein, such a temporal relationship may be established with respect to a time between occurrence of antecedent events in the antecedent time series and their respective correlated consequent events in the consequent time series. As a non-limiting example, a temporal relationship may be established which indicates that a given consequent event corresponding to an antecedent event occurs, on average, 30 seconds after the corresponding antecedent event. In such an example, the cyber event may be correlated to an event of the antecedent time series which occurred 30 seconds before the cyber event as represented in the consequent time series. In an embodiment, the correlation is performed as described further below with respect to FIG. 4.

At S260, a root cause of the cyber event is determined based on the correlation. In an embodiment, a temporal cause represented in an antecedent time series determined via correlation to the cyber event as represented in a consequent time series is identified, and the temporal cause is analyzed in order to determine the root cause of the cyber event.

In an embodiment, the temporal cause of the cyber event is determined as an antecedent event which was correlated to the cyber event (e.g., based on a time difference between the temporal cause and the cyber event matching a time difference of a temporal relationship between the antecedent time series and the consequent time series).

In turn, such an antecedent event may correspond to one or more entities, activities, or conditions in a computing environment such as, but not limited to, an entity which was modified via the antecedent event (e.g., an entity which was modified by a commit operation), an entity which was deployed via the antecedent event (e.g., a container image which was pushed or a virtual machine which was instantiated), an entity which was accessed, an entity to which authentication credentials were submitted, an entity which was called (e.g., a process or function) a modification activity (e.g., a modification of a computing component via a commit), a deployment activity (e.g., pushing of a container image or instantiation of a virtual machine), an access activity (e.g., an access of a database, storage, or service), an authentication activity, a condition (e.g., increased power consumption or increased network traffic), an entity affected by a change in circumstances (e.g., an entity which is demonstrating increased power consumption as reflected in values of a power consumption parameter), and the like.

Accordingly, in an embodiment, the root cause of the cyber event may be determined as an activity (e.g., a push or commit operation), an entity (e.g., a software component, a hardware component, a process, a function, a network component, a user, an identity, etc.), a condition (e.g., a condition represented by a particular value or change in values), or a combination thereof. As discussed further below, the type of root cause may affect which remediation actions are to be used to remediate the cyber event.

At S270, the cyber event is remediated. More specifically, the cyber event is remediated based on the identified root cause. Remediating the cyber event may include, but is not limited to, blocking traffic to one or more computing components, reconfiguring one or more software components, rebuilding one or more software containers, sending a notification indicating the cyber event, combinations thereof, portions thereof, and the like. To this end, in an embodiment, remediating the cyber event further includes determining, based on the identified root cause, which remediation steps to apply, where to apply remediation steps (e.g., to certain software components, computing environments, networks, etc.), or both.

In an embodiment, the remediation steps may be determined based further on the type of root cause identified for the cyber threat. As a non-limiting example, when an activity determined to be a root cause is pushing of a software container, remediation may include dismissing or rebuilding the software container. As another non-limiting example, when an entity determined to be a root cause is a server demonstrating increased power consumption, remediation may include deploying a second server and diverting at least some traffic to the second server.

FIG. 3 is a flowchart S230 illustrating a method for determining a temporal relationship between time series according to an embodiment.

At S310, time series to be analyzed for temporal relationships are identified. The time series may be or may include time series generated based on potential time series data related to activities within a computing environment, for example time series generated as discussed above with respect to S220.

At S320, events of each time series are identified. As noted above, for each time series, the events may be explicitly indicated in the time series, or may be determined implicitly by analyzing values of the time series (e.g., to identify a value being above or below a threshold as the event, or to identify a change in values as the event). In an embodiment, the identified events include such explicitly indicated events, such implicitly determined events, or both.

At S330, pairs of time series are created based on the identified events. In an embodiment, each pair includes two time series among the identified time series. The pairs may be created such that each possible combination of two time series is represented among the pairs, or may be created only using a subset of such combinations. A subset of such combinations may be used when, for example, predetermined rules for pairing time series indicate that certain kinds of time series are by default considered to be unrelated. Analyzing all potential combinations may yield new temporal relationships which might otherwise go undiscovered, while eliminating certain combinations via predetermined rules may improve efficiency of subsequent processing by eliminating the need to analyze some time series pairs (i.e., reducing the total number of time series pairs to be analyzed).

At S340, matching is performed between time series among each time series pair. In an embodiment, performing the matching between time series in each time series pair includes comparing times of events between the two time series of the time series pair. In a further embodiment, the matching is performed based on distances between time series of each time series pair. To this end, in such an embodiment, matching between the time series includes determining a distance between the time series of each time series pair.

In yet a further embodiment, the matching is performed based on distances calculated between pairs of events between the two time series of each time series pair. In such an embodiment, each distance is calculated between an event of a first time series of the pair and an event of a second time series in the pair. Moreover, each distance may be calculated between events based on time order, that is, the time of the first event in the first time series may be compared to the time of the first event in the second time series, the time of the second event in the first time series may be compared to the time of the second event in the second time series, the time of the third event in the first time series may be compared to the time of the third event in the second time series, and so on. The result is a set of distances between respective pairs of events from different time series of the time series pair.

In an embodiment, the distance for a time series pair is determined using dynamic time warping (DTW) based on the events in each time series of the time series pair. In another embodiment, the distance between time series in a time series pair is determined as a Euclidean distance calculated based on vector representations of the events of each time series, i.e., a Euclidean distance between two such vectors.

In some embodiments, the matching includes determining one or more statistical measures based on distances between events in the time series of each time series pair in order to represent each time series pair using such statistical metrics. Such statistical measures may include, but are not limited to, mean distance, standard deviation for distance, precision, recall, probability densities, combinations thereof, and the like. In a further embodiment, if the mean distance between times of events differs from any of the individual distances between events from different time series above a threshold, then the time series pair is determined as not matching. In another embodiment, if the standard deviation for distances between the time series of the pair is above a predetermined threshold, then the time series pair is determined as not matching.

In an embodiment, each time series pair may be analyzed, prioritized, or both, using metrics such as, but not limited to, F-1 score (e.g., to measure predictive performance between different time series), earth mover's distance (e.g., to measure dissimilarity between different time series), comparisons between probability density functions, numbers of events which are within threshold periods of time from each other between time series, combinations thereof, and the like. Such comparisons may be utilized, for example, to score different potential measures of similarity between different time series. Such scores may be aggregated in order to create an aggregated score for each time series pair which effectively demonstrates a degree of causality between events in different time series, which in turn may be utilized to determine matching pairs of time series at S350.

At S350, matching pairs of time series are identified. In an embodiment, the matching pairs of time series are identified based on the distances between their respective time series. In some embodiments, the first and second time series of a given time series pair are determined to match when the distance between the time series (e.g., an average of distances between pairs of events between the time series of the time series pair) is below a predetermined threshold. Such matching pairs of time series may be determined as having an antecedent-consequent relationship (also referred to as an antecedent relationship).

In some embodiments, matching pairs of time series may be identified using a multi-stage process. In a first stage of such an embodiment, distances of the pairs of time series may be analyzed in order to filter out time series pairs which do not match using a distance-based comparison. In the first stage, time series pairs having a distance above a threshold may be filtered out. Such filtering may be performed using a comparison based only on distance in order to avoid subsequent processing of the filtered pairs, thereby conserving computing resources.

In a second stage of such an embodiment, one or more statistical metrics may be analyzed with respect to the remaining (unfiltered) pairs in order to determine the matching pairs. Such statistical metrics may include, but are not limited to, earth-mover's distance, F-score or F-measure, recall, combinations thereof, and the like. In a further embodiment, similarity between the time series in a given time series pair may be scored with respect to each statistical metric being analyzed, and an aggregated similarity score may be generated by aggregating the individual statistical metric scores. Pairs having an aggregated similarity score above a predetermined threshold may be determined to be matching.

Alternatively, or in combination, a cost function may be applied which penalizes certain statistical metrics, rewards certain statistical metrics, or both. Such a cost function may also penalize certain circumstances such as, but not limited to, heavily punishing time series pairs where some pairs of events between time series of the time series pair occur in a different order (e.g., some events from time series A occur before their corresponding events from time series B, and some events from time series B occur before their corresponding events from time series A). In this regard, it is noted that a true causal relationship between two time series would result in events from one time series consistently occurring before corresponding events in the other time series such that differences in which time series' events occur first between different instances of events indicates that the time series are very unlikely to demonstrate a causal relationship and, consequently, should not be determined to be matching. In such an embodiment, the cost may be pushed to infinity when some event pairs demonstrate different orders between with respect to their respective time series than others.

In this regard, it is noted that a given time series may be matched to multiple other time series based on distance alone, but that more accurate matching may be performed by further analyzing statistical metrics. Accordingly, performing such statistics-based matching in addition to distance-based matching may improve the accuracy of matching which, in turn, would improve cybersecurity when matching time series pairs are utilized to determine root causes of cyber events as discussed herein. Moreover, as noted above, distance-based matching may be used to filter pairs which are not close to matching, which allows for conserving computing resources by only performing statistics-based matching on the pairs which are not filtered out using distance-based matching.

In some embodiments, a cleaning and denoising algorithm may be applied to further clean matching results. Such a cleaning and denoising algorithm may apply one or more clustering algorithms with respect to the time series pairs determined to be matching. Such clustering algorithms may include, but are not limited to, K-means clustering, density-based spatial clustering of applications with noise (DBSCAN), hierarchical DBSCAN (HDBSCAN), a combination thereof, and the like. In a further embodiment, a distance matrix may be created based on the distances between pairs of events of different time series for each time series pair, and applying one or more clustering algorithms to the distance matrix.

At S360, antecedent and consequent time series are determined for each matching pair of time series. That is, for each time series pair, a first time series of the pair is determined to be an antecedent time series and a second time series of the pair is determined to be a consequent time series corresponding to the antecedent time series, where at least some events represented by data in the antecedent time series can be correlated to events represented by data in the corresponding consequent time series in order to determine root causes of those antecedent events.

In an embodiment, determining the antecedent and consequent time series for each time series pair further includes applying one or more antecedent-consequent determination rules to each time series pair. In a further embodiment, the antecedent-consequent determination rules define certain predetermined entities, activities, conditions, or a combination thereof, each as being either antecedent or consequent. That is, in such an embodiment, the antecedent-consequent determination rules may define certain predetermined combinations of time series (e.g., one time series for a first entity, activity, or condition; and another time series for a second entity, activity, or condition) such that one of the time series in the combination is determined to be antecedent when included in a matching time series pair with another time series which is defined as consequent for that combination. In other words, in such an embodiment, the antecedent-consequent rules may predefine certain known combinations of antecedent and consequent time series based on types of information they represent such that, when a matching time series pair meets the profile of one of the known combinations of antecedent and consequent time series, the antecedent and consequent time series for that matching time series pair may be determined using the predetermined combination.

In this regard, it is noted that identifying antecedent and consequent time series based solely on predetermined relationships (e.g., relationships between known combinations of antecedent and consequent time series) alone would result in inaccurately identifying certain time series as having a causal relationship where there is none. By first matching time series as described herein, the causal relationships can be established and then known antecedent and consequent combinations may be leveraged in order to identify which time series in each matching pair is antecedent and which is consequent with a high degree of accuracy.

At S370, antecedent relationships are established for the matching time series pairs. As noted above, each such relationship represents an antecedent-consequent relationship between an antecedent time series and a corresponding consequent time series of the time series pair.

In an embodiment, establishing the antecedent relationships for a time series pair includes determining a mean or other representative time difference for events between the time series of the time series pair. Such a mean time difference may be a mean distance determined as discussed above, for example with respect to S340. The mean or other representative time difference may be utilized to determine the antecedent events for consequent events reflected in one of the time series pairs, for example, to determine an antecedent event for a cyber event as discussed herein.

It should be noted that, in at least some implementations, multiple time series may be determined as being antecedent to a given consequent time series. That is, when matching pairs of time series are identified and analyzed to determine which time series is antecedent and which time series is consequent in a given antecedent-consequent time series pair, the process may result in the same consequent time series being included in multiple time series pairs having an antecedent-consequent relationship. To this end, in some embodiments, establishing the antecedent relationships may further include selecting one of the antecedent time series as being the antecedent time series for that consequent time series. As a non-limiting example, an antecedent time series having the lowest distance to the consequent time series may be selected as the antecedent for that consequent time series.

FIG. 4 is a flowchart illustrating a method for correlating events using temporal cause analysis according to an embodiment.

At S410, a cyber event to be analyzed is identified. The cyber event may be, but is not limited to, a cybersecurity event generated or otherwise reported by one or more cybersecurity tools (e.g., the cyber tools 123, FIG. 1). To this end, in an embodiment, the cyber event may be identified when the cyber event is detected or otherwise when a cybersecurity tool reports the detected cyber event.

At S420, a time series of the cyber event is identified. The time series of the cyber event is a time series to which the cyber event belongs as determined, for example, by comparing a time of the cyber event to times of the time series or by matching an entity or activity related to the cyber event to entities and activities represented by different time series. In an embodiment, S420 includes analyzing consequent time series among time series pairs, and the time series of the cyber event is identified as one of the analyzed consequent time series.

In an embodiment, the cyber event is a cybersecurity event which is reflected by data represented in a time series for which a temporal relationship was established (e.g., as discussed above with respect to FIG. 3). More specifically, a time series to which the cyber event belongs may be determined by matching times between events represented in different time series having known temporal relationships and the time of the cyber event, by identifying an entity or activity represented in a time series which is also indicated in data describing the cyber event, both, and the like.

At S430, an antecedent time series is identified for the cyber event. In an embodiment, the antecedent time series for the cyber event is an antecedent time series in the time series pair to which the consequent time series of the cyber event belongs (e.g., based on an antecedent-consequent relationship established, for example, as discussed above with respect to S370).

At S440, time deltas are analyzed between potential antecedent events in the identified antecedent time series and the cyber event of the consequent time series. More specifically, time deltas are analyzed between events represented in the antecedent and consequent time series. That is, each time delta effectively represents an amount of time between a potential antecedent event represented in the antecedent time series and the cyber event represented in the consequent time series.

As noted above, in some embodiments, the established antecedent-consequent relationships includes a mean or otherwise representative time difference between antecedent events and their corresponding consequent events of event pairs between time series of the time series pair. In other words, each time series pair having an antecedent relationship may be known to have an average or otherwise normal difference in time. In an embodiment, this average or known time difference is compared to the difference in time between the cyber event and one or more antecedent events of the antecedent time series.

At S450, an antecedent event for the cyber event is identified based on the time delta analysis. In an embodiment, an antecedent event for which the time difference between the antecedent event and the cyber event is within a threshold from the average or normal time difference for the time series pair is identified as the antecedent event for the cyber event.

FIGS. 5A-B are example illustrations 500A and 500B, respectively, utilized to describe temporal cause analysis in accordance with various disclosed embodiments.

As shown in FIG. 5A, events are plotted in a scatter plot 510. More specifically, a first set of events 520 is depicted along a top portion of the scatter plot 510, and a second set of events 530 is depicted along a bottom portion of the scatter plot 510. In the example implementation depicted in FIG. 5A, the first set of events 520 includes events involving container images being pushed to container repositories, and the second set of events 530 includes events involving commits being pushed to new code repositories.

As shown in FIG. 5A, the sets of events 520 and 530 are connected via a set of lines 540 connecting between events of the respective sets of events 520 and 530. More specifically, each event from the set of events 520 is connected to a corresponding event from the set of events 530. More specifically, commit events represented among the events 530 precede container push events represented among the events 520 such that commit events may be represented as antecedent events for corresponding container push events acting as consequent events.

FIG. 5B shows a zoomed in view 500B of the illustration 500A. As illustrated by FIG. 5B, the lines 540 connecting between events of the set of events 530 and events of the set of events 520 demonstrate an upward right slope, indicative of the events 530 preceding corresponding events among the events 520.

FIG. 6 is an example schematic diagram of a temporal cause analyzer 130 according to an embodiment. The temporal cause analyzer 130 includes a processing circuitry 610 coupled to a memory 620, a storage 630, and a network interface 640. In an embodiment, the components of the temporal cause analyzer 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the temporal cause analyzer 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for temporal cause analysis, comprising:

creating a time series pair for a computing environment, wherein the time series pair includes a first time series and a second time series, wherein each of the first time series and the second time series includes a series of data points arranged by time;

determining a distance between the first time series and the second time series based on the series of data points of each of the first time series and the second time series;

identifying a match between the first time series and the second time series based on the determined distance;

determining an antecedent-consequent relationship for the time series pair based on the identified match between the first time series and the second time series, wherein the first time series is determined as an antecedent time series of the antecedent-consequent relationship and the second time series is determined as a consequent time series of the antecedent-consequent relationship;

identifying a root cause of a cyber event based on the antecedent-consequent relationship, wherein the cyber event is defined with respect to at least one of the data points of the series of data points of the second time series, wherein the root cause of the cyber event is identified based further on at least one of the data points of the series of data points of the first time series;

generating a remediation workflow based on the identified root cause of the cyber event; and

transmitting, to a device, a notification with the remediation workflow for implementation within the computing environment.

2. The method of claim 1, wherein determining the antecedent-consequent relationship for the time series pair further comprises:

identifying a plurality of events with respect to the series of data points of each of the first time series and the second time series, each event having a corresponding time, wherein the distance is determined based on the plurality of events identified with respect to the series of data points of each of the first time series and the second time series.

3. The method of claim 2, wherein the distance is a second distance, further comprising:

determining a plurality of first distances between times of events of the first time series and times of events of the second time series, wherein the second distance is determined based on the plurality of first distances.

4. The method of claim 2, wherein the plurality of events identified with respect to the series of data points of the first time series is a plurality of antecedent events, wherein the plurality of events identified with respect to the series of data points of the second time series is a plurality of consequent events, further comprising:

correlating each antecedent event of the plurality of antecedent events to at least one consequent event of the plurality of consequent events, wherein each antecedent event occurs earlier in time than the correlated at least one consequent event for the antecedent event.

5. The method of claim 1, further comprising:

determining an antecedent event for the cyber event, wherein the antecedent event is determined with respect to at least one of the data points of the series of data points of the first time series, wherein the root cause of the cyber event is identified based on the determined antecedent event for the cyber event.

6. The method of claim 5, wherein determining the antecedent event for the cyber event further comprises:

analyzing a plurality of time deltas between the series of data points of the first time series and the cyber event, wherein the antecedent event for the cyber event is identified based on the analyzed plurality of time deltas.

7. The method of claim 1, wherein the distance is determined using dynamic time warping.

8. The method of claim 1, wherein the antecedent time series of the antecedent-consequent relationship precedes the consequent time series of the antecedent-consequent relationship.

9. The method of claim 1, further comprising:

performing at least one remediation action based on the identified root cause of the cyber event.

10. A non-transitory computer readable medium having stored thereon instructions for causing a processing circuitry to execute a process, the process comprising:

creating a time series pair for a computing environment, wherein the time series pair includes a first time series and a second time series, wherein each of the first time series and the second time series includes a series of data points arranged by time;

determining a distance between the first time series and the second time series based on the series of data points of each of the first time series and the second time series;

identifying a match between the first time series and the second time series based on the determined distance;

20 determining an antecedent-consequent relationship for the time series pair based on the identified match between the first time series and the second time series, wherein the first time series is determined as an antecedent time series of the antecedent-consequent relationship and the second time series is determined as a consequent time series of the antecedent-consequent relationship;

identifying a root cause of a cyber event based on the antecedent-consequent relationship, wherein the cyber event is defined with respect to at least one of the data points of the series of data points of the second time series, wherein the root cause of the cyber event is identified based further on at least one of the data points of the series of data points of the first time series;

generating a remediation workflow based on the identified root cause of the cyber event; and transmitting, to a device, a notification with the remediation workflow for implementation within the computing environment.

11. A system for temporal cause analysis, comprising:

a processing circuitry; and a memory, the memory containing instructions that, when executed by the processing circuitry, configure the system to:

create a time series pair for a computing environment, wherein the time series pair includes a first time series and a second time series, wherein each of the first time series and the second time series includes a series of data points arranged by time;

determine a distance between the first time series and the second time series based on the series of data points of each of the first time series and the second time series;

identify a match between the first time series and the second time series based on the determined distance;

determine an antecedent-consequent relationship for the time series pair based on the identified match between the first time series and the second time series, wherein the first time series is determined as an antecedent time series of the antecedent-consequent relationship and the second time series is determined as a consequent time series of the antecedent-consequent relationship;

identify a root cause of a cyber event based on the antecedent-consequent relationship, wherein the cyber event is defined with respect to at least one of the data points of the series of data points of the second time series, wherein the root cause of the cyber event is identified based further on at least one of the data points of the series of data points of the first time series;

generate a remediation workflow based on the identified root cause of the cyber event; and transmit, to a device, a notification with the remediation workflow for implementation within the computing environment.

12. The system of claim 11, wherein the system is further configured to:

identify a plurality of events with respect to the series of data points of each of the first time series and the second time series, each event having a corresponding time, wherein the distance is determined based on the plurality of events identified with respect to the series of data points of each of the first time series and the second time series.

13. The system of claim 12, wherein the distance is a second distance, wherein the system is further configured to:

determine a plurality of first distances between times of events of the first time series and times of events of the second time series, wherein the second distance is determined based on the plurality of first distances.

14. The system of claim 12, wherein the plurality of events identified with respect to the series of data points of the first time series is a plurality of antecedent events, wherein the plurality of events identified with respect to the series of data points of the second time series is a plurality of consequent events, wherein the system is further configured to:

correlate each antecedent event of the plurality of antecedent events to at least one consequent event of the plurality of consequent events, wherein each antecedent event occurs earlier in time than the correlated at least one consequent event for the antecedent event.

15. The system of claim 11, wherein the system is further configured to:

determine an antecedent event for the cyber event, wherein the antecedent event is determined with respect to at least one of the data points of the series of data points of the first time series, wherein the root cause of the cyber event is identified based on the determined antecedent event for the cyber event.

16. The system of claim 15, wherein determining the antecedent event for the cyber event further comprises:

analyze a plurality of time deltas between the series of data points of the first time series and the cyber event, wherein the antecedent event for the cyber event is identified based on the analyzed plurality of time deltas.

17. The system of claim 11, wherein the distance is determined using dynamic time warping.

18. The system of claim 11, wherein the antecedent time series of the antecedent-consequent relationship precedes the consequent time series of the antecedent-consequent relationship.

19. The system of claim 11, further comprising:

perform at least one remediation action based on the identified root cause of the cyber event.

20. The method of claim 1, wherein the remediation workflow includes at least one of (i) reconfiguring a software component, (ii) rebuilding a software container, or (iii) blocking network traffic directed to a component.

* * * * *